US012451591B2

(12) United States Patent
Jaffri et al.

(10) Patent No.: US 12,451,591 B2
(45) Date of Patent: Oct. 21, 2025

(54) ANTENNA ARRANGEMENT FOR RFID-INTEGRATED SCANNING DEVICE

(71) Applicant: ZEBRA TECHNOLOGIES CORPORATION, Lincolnshire, IL (US)

(72) Inventors: Rehan K. Jaffri, Tarrytown, NY (US); Steven D. Sieckowski, Port Jefferson, NY (US); Eric Trongone, Coram, NY (US); Amit Asthana, Germantown, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 170 days.

(21) Appl. No.: 18/115,300

(22) Filed: Feb. 28, 2023

(65) Prior Publication Data
US 2024/0291133 A1 Aug. 29, 2024

(51) Int. Cl.
*H01Q 1/24* (2006.01)
*G06K 7/10* (2006.01)

(52) U.S. Cl.
CPC .......... *H01Q 1/24* (2013.01); *G06K 7/10881* (2013.01); *G06K 7/1097* (2013.01)

(58) Field of Classification Search
CPC ...... H01Q 1/24; H01Q 13/10; G06K 7/10881; G06K 7/1097
See application file for complete search history.

(56) References Cited

U.S. PATENT DOCUMENTS

| | | | | |
|---|---|---|---|---|
| 5,828,052 A * | 10/1998 | Reynolds | ........... | G06K 7/10881 235/472.01 |
| 6,517,000 B1 * | 2/2003 | McAllister | ......... | G06K 7/10881 235/472.01 |
| 8,240,530 B2 * | 8/2012 | Fletcher | ................... | A45F 3/14 224/616 |
| 9,041,606 B2 * | 5/2015 | Faraone | ................. | H01Q 1/243 343/866 |
| 9,436,226 B2 * | 9/2016 | Chen | ................... | G06K 7/10881 |
| 10,521,629 B2 * | 12/2019 | Drzymala | .......... | G02B 19/0061 |
| 10,790,572 B1 * | 9/2020 | DiGregorio | ............ | H01Q 9/285 |

(Continued)

OTHER PUBLICATIONS

International Search Report and Written Opinion for International Application No. PCT/US24/14865 mailed on May 6, 2024.

*Primary Examiner* — Steven S Paik
*Assistant Examiner* — Asifa Habib

(57) ABSTRACT

The disclosure is a scanning device comprising a scanning assembly including a scanning engine and a scan window; a bezel including a first opening, a second opening, and a bezel body extending between the first and second openings and having an inner surface and outer surface; an antenna assembly including a transceiver and at least one antenna element; and a housing including a handle portion, a head portion, and a trigger portion. The scanning engine is coupled to the scan window and the scan window at least partially covers the first opening. The antenna element is arranged around at least a portion of a surface of the bezel body. The head portion is configured to include the bezel, at least a portion of the antenna assembly, and at least a portion of the scanning assembly, and the trigger portion which couples to the scanning engine.

20 Claims, 6 Drawing Sheets

(56) References Cited

U.S. PATENT DOCUMENTS

| | | | |
|---|---|---|---|
| 2005/0023358 A1* | 2/2005 | Byun | G07G 1/0045 |
| | | | 235/462.48 |
| 2009/0091449 A1* | 4/2009 | Claessen | H01Q 9/0428 |
| | | | 340/572.1 |
| 2009/0295567 A1 | 12/2009 | Bellows | |
| 2011/0073658 A1* | 3/2011 | Vassura | G06K 7/10881 |
| | | | 235/472.01 |
| 2012/0105205 A1* | 5/2012 | Claessen | H01Q 13/10 |
| | | | 235/462.13 |
| 2013/0153659 A1 | 6/2013 | Franz | |
| 2016/0094070 A1* | 3/2016 | Mazzone | H02J 7/0044 |
| | | | 320/115 |
| 2019/0156085 A1* | 5/2019 | Handshaw | G06K 7/10881 |
| 2021/0013591 A1* | 1/2021 | McCaughey | H01Q 9/26 |
| 2021/0165982 A1 | 6/2021 | Drzymala | |
| 2021/0166212 A1* | 6/2021 | Ichikawa | G06Q 20/202 |
| 2023/0229876 A1 | 7/2023 | Tu | |
| 2023/0352809 A1* | 11/2023 | Kim | H01Q 1/2266 |
| 2024/0291133 A1* | 8/2024 | Jaffri | G06K 7/1097 |
| 2024/0421503 A1* | 12/2024 | Chen | H01Q 13/10 |

\* cited by examiner

ANTENNA ARRANGEMENT FOR RFID-INTEGRATED SCANNING DEVICE

BACKGROUND

Handheld scanners are often utilized to read barcodes or radio frequency identification ("RFID") tags that are affixed to objects to register pricing, track inventory, and a variety of other purposes. These scanners often must adhere to design requirements such that the scanner is compact and ergonomically user-friendly. RFID antennas are generally required to be a certain size based on the frequency of operation and the resulting wavelength. Scanners that integrate both barcode reading and RFID functionality face issues in meeting such size requirements. RFID antennas are highly sensitive to the presence of metal or a lossy material. Therefore, these antennas are generally located away from the metallic components of the barcode reader (e.g., in a "foot" at the bottom of the scanner or a "chin" below and in front of the exit window of the scanner, or a "crown" above the exit window of the scanner) to avoid interference from the scanning engine of the barcode reader which may degrade antenna performance. These implementations may exceed design specifications for RFID-integrated scanners that have ergonomic and size requirements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
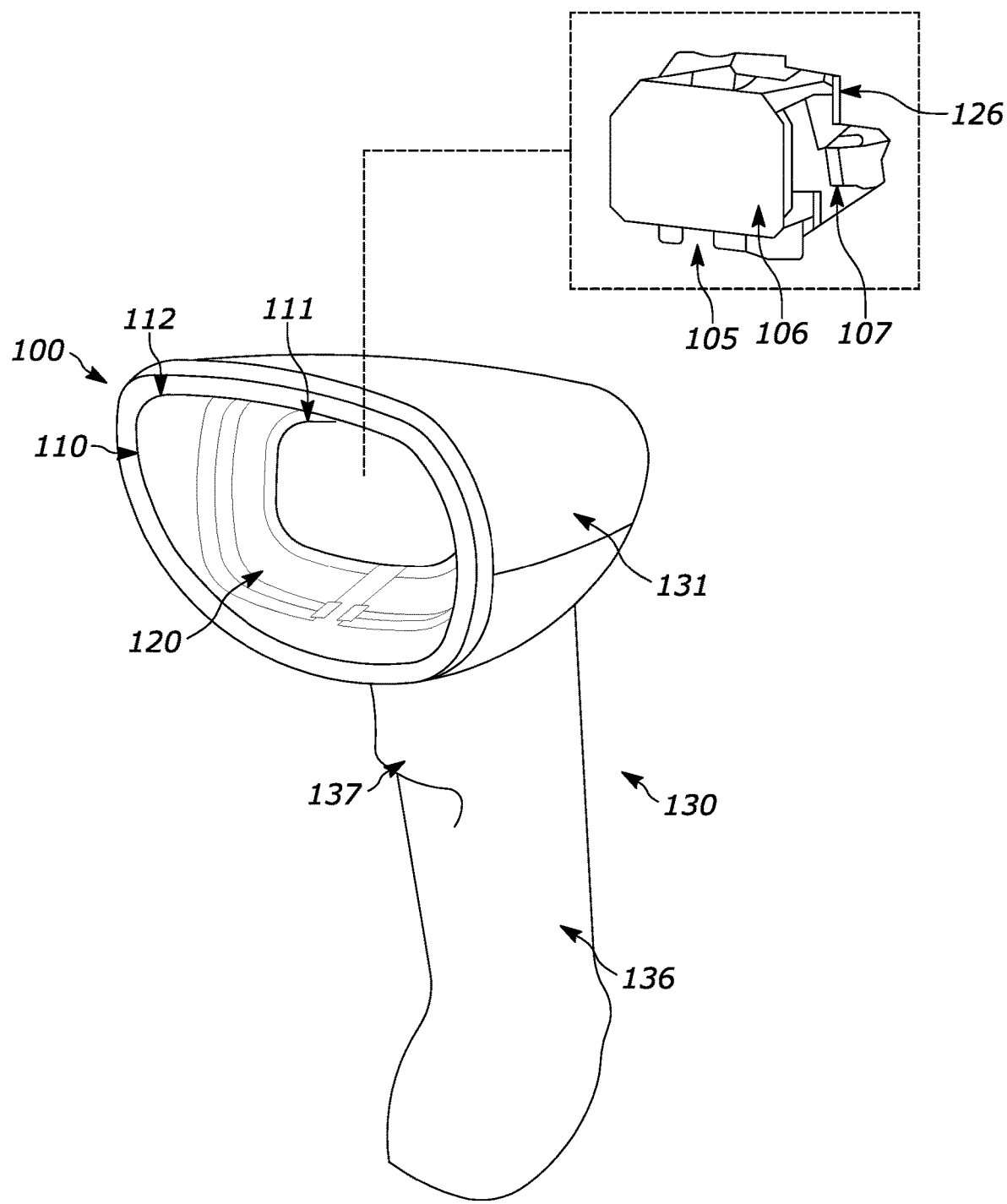
FIG. 1 is a diagram showing an example embodiment of a scanning device of the present disclosure

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Scanners that integrate RFID functionality into barcode readers often position the RFID antenna as far from the scanning engine of the barcode reader as possible in order to ensure proper RFID functionality. However, this results in the overall product increasing in size which could result in a scanner that fails to meet the design requirements for some applications. In the present disclosure, a scanning device with barcode reading and RFID functionality, which has an RFID antenna arranged around the inner surface of a bezel proximate to the scanning engine of the barcode reader, while retaining a compact size and ergonomic form, is provided.

Examples disclosed herein are directed to a scanning device, comprising: a scanning assembly including a scanning engine and a scan window, the scanning engine being coupled to the scan window; a bezel including a first opening, a second opening, and a bezel body extending between the first and second opening and having an inner surface and an outer surface, the scan window at least partially covering the first opening of the bezel body; an antenna assembly including a transceiver and at least one antenna element, the antenna element being arranged around at least a portion of the first or second surface of the bezel body; and a housing including a handle portion, a head portion, and a trigger portion, the head portion being configured to include the bezel, at least a portion of the antenna assembly, and at least a portion of the scanning assembly, and the trigger portion which couples to the scanning engine and may extend from the head portion or the handle portion of the housing.

FIG. 1 illustrates an example embodiment of a scanning device of the present disclosure. A scanning device 100 may include a scanning assembly 105 having a scan window 106 and a scanning engine 107, which is configured to enable the reading of barcodes by the scanning device 100. The scanning engine 107 may include an illumination system, an imaging system, and an aiming system to allow for the scanning and decoding of barcodes. The scanning engine 107 may be coupled to the scan window 106. The scan window 106 protects the scanning engine 107 and keeps foreign objects from entering and damaging the scanning device 100. The scan window 106 may be, for example, a sheet of glass.

Figure 2:
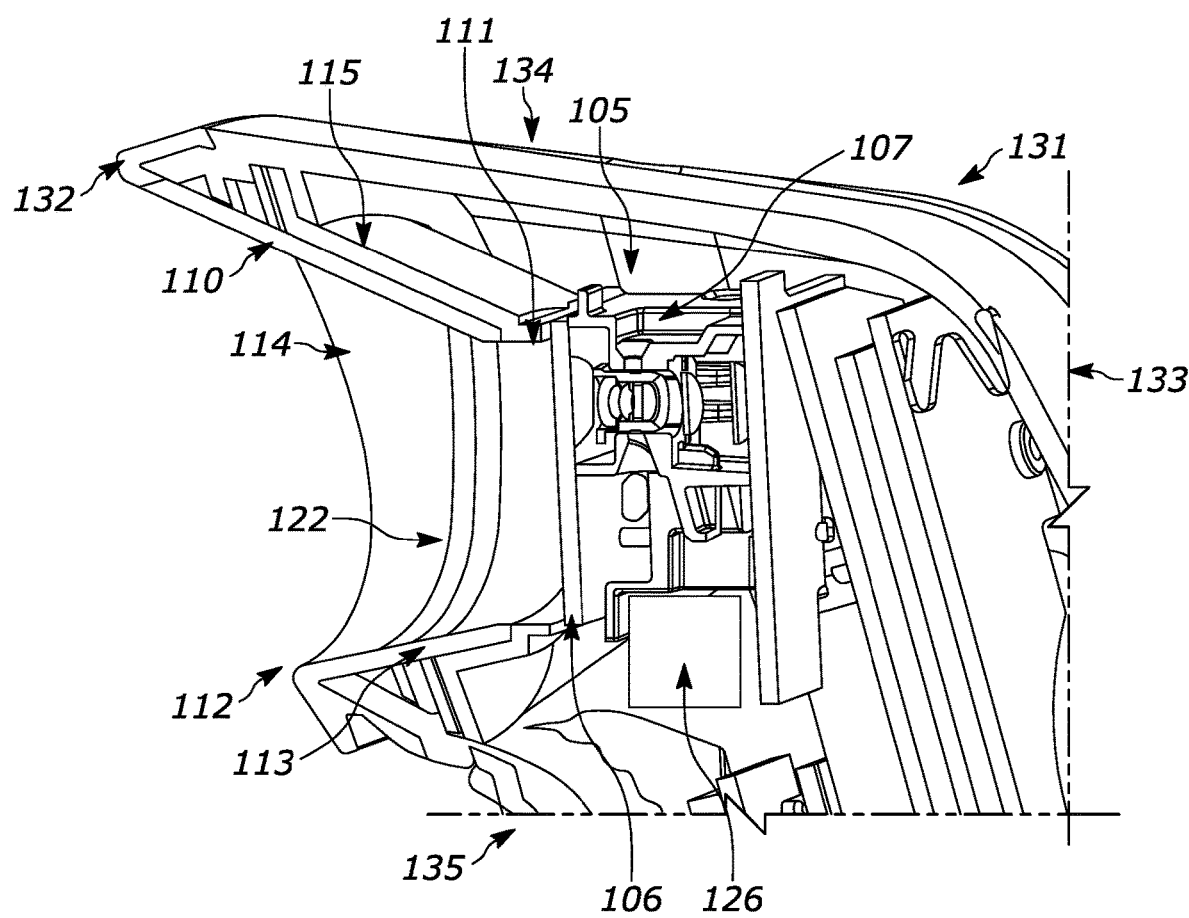
FIG. 2 is a diagram showing cross-sectional profile view of an example embodiment of a scanning device of the present disclosure.

The scanning device 100 may also include a bezel 110, which serves to further protect the scanning engine 107 and prevent excess light exterior to the scan window 106 from entering the scan engine 107 to ensure proper operation. The bezel 110 may include a first opening 111, a second opening 112, and a bezel body 113 (as shown in FIG. 2). The bezel body 113 extends from the first opening 111 to the second opening 112 of the bezel 110 and may be made of a plastic material. The bezel body 113 may include an inner surface 114 and outer surface 115. The scan window 106 at least partially covers the first opening 111 of the bezel 110, such that the scanning engine 107 coupled to the scan window 106 is configured to read barcodes by scanning out of the scan window 106, through the first opening 111, along the bezel body 113, and out of the second opening 112.

The scanning device 100 may also include an antenna assembly 120 including a transceiver 126 and at least one antenna element 122 configured to provide RFID functionality to the scanning device 100. The antenna element 122 may be arranged around at least a portion of the inner surface 114 or outer surface 115 of the bezel body 113 such that the antenna 122 is proximate to the scanning engine 107 of the scanning assembly 105.

The scanning device 100 may also include a housing 130, having a head portion 131, a handle portion 136, and a trigger portion 137. The head portion 131 of the housing 130 is configured to include the bezel 110, at least a portion of the antenna assembly 120 (e.g. the antenna element 122), and at least a portion of the scanning assembly 105. The trigger portion 137 may couple to the scanning engine 107 to enable use of the scanning device 100 upon actuation of the trigger portion 137. For example, the trigger portion 137 may be a trigger, with or without a trigger guard, which when pulled activates the scanning engine 107 to enable the reading of barcodes or the antenna assembly 120 to enable the reading RFID tags. The trigger portion 137 may also include a button or other means, which when actuated activates the scanning engine 107 to enable the reading of barcodes or the transceiver 126 to enable the reading of RFID tags. The trigger portion 137 may extend from the head portion 131 or the handle portion 136. The housing 130 may also include ergonomic indentions on the handle portion 136 of the housing 130 to allow for the scanning device 100 to be easily and comfortably handled by a user. Additionally, the handle portion 136 and the head portion 131 may be a single molded piece.

FIG. 2 is a diagram illustrating a cross-sectional profile view of an example embodiment of a head portion of a scanning device of the present disclosure. The head portion 131 may contain the scanning engine 107, scan window 106, and the bezel 110. The scanning engine 107 couples to the scan window 106 which at least partially covers the first opening 111 of the bezel 110. The head portion 131 may include a front side 132, a rear side 133, a top side 134, and a bottom side 135. The second opening 112 of the bezel 110 may be arranged at the front side 132 of the head portion 131 of the housing 130. The handle portion 136 of the housing 130 may couple to at least the bottom side 135 or the rear side 133 of the head portion 131. The head portion 131 of a scanning device 100 may also include at least a portion of the antenna assembly 120. For example, the head portion 131 may include at least one antenna element 122, such as a dipole antenna, arranged around the inside surface 114 or outside surface 115 of the bezel body 113. The bezel 110 may attach to the housing at the second opening 112, using, for example, clips that hang from the front side 132 of the head portion 131 and attach to the outer surface 115 of the bezel body 113 at or near the second opening 112.

Figure 3A:
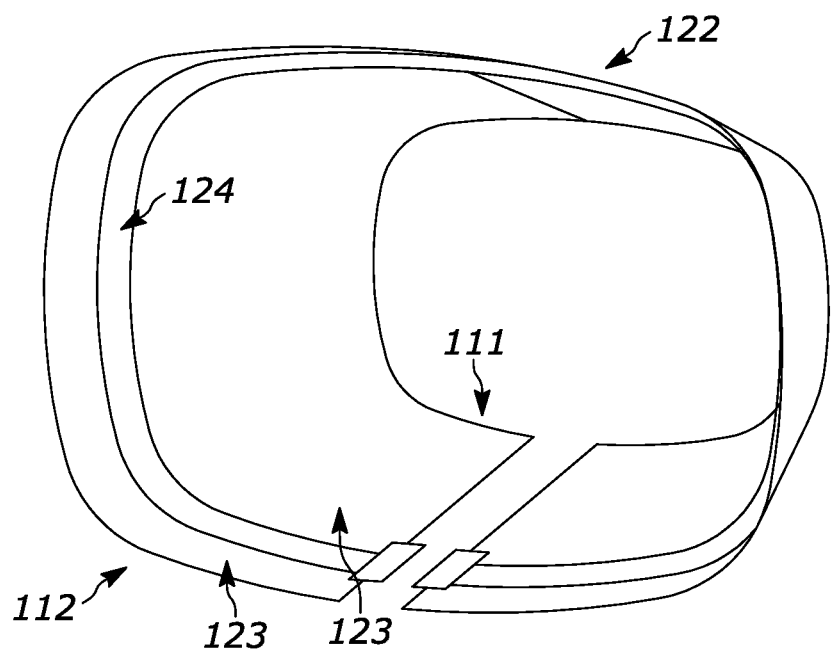
FIGS. 3a-d illustrate various examples of antenna elements of a scanning device of the present disclosure.

FIGS. 3a-d illustrate various example embodiments of antenna elements that may be arranged at least partially around a surface of the bezel. As shown in FIG. 3a, the antenna element 122 may include a slot antenna having a metal conducting plane 123 and a radiating slot 124. The antenna 122 may be formed to fit into the shape of the bezel 110 to be readily attached to the inner surface 114 or outer surface 115 of the bezel body 113, such that the antenna element 122 is proximate to the scanning engine 107. In some examples, the antenna element 122 may extend from the first opening 111, along the bezel body 113 to the second opening 112, such that it covers a majority of the inner surface 114 or outer surface 115 of the bezel body 113. In other examples, the antenna element 122 may cover a small surface area of the inner surface 114 or outer surface 115 of the bezel body 113. The antenna element(s) 122 of the antenna assembly 120 may be arranged around the inner surface 114 or outer surface 115 of the bezel body 113 in a location closer to the first opening 111 than the second opening 112 of the bezel 110. For example, the antenna element 122 may align with the first opening 111 or be located near the opening 111 such that it is proximate to the scanning engine 107 and extend along the bezel body 113 and stop before reaching the second opening 112 so that the antenna element 122 is closer to the first opening 111 than the second opening 112. Alternatively, the antenna element 122 may be arranged around the inner surface 114 or outer surface 115 of the bezel body 113 in a location closer to the second opening 112 than the first opening 111. Additionally, the antenna element(s) 122 of the antenna assembly 120 may at least partially be embedded in the plastic material of the bezel body 113.

The at least one antenna element 122 of the antenna assembly 120 may be fed via a coaxial cable feed (not shown). The coaxial cable feed may run, for example, from the outside surface of the antenna element 122, between the outer surface of the antenna element 122 and the inside surface 114 of the bezel body 113. The coaxial cable feed may then connect to the transceiver 126, such as an RFID radio, which may be positioned in the head portion 131 of the housing 130 behind the scanning engine 107, relative to the scan window 106. The transceiver 126 may be configured to use a low transmit power to prevent interference with the operation of the scanning engine 107. Additionally, the gain of the antenna element 122 may be limited to a lower value to prevent interference with the normal operation of the scanning engine 107.

Figure 3B:
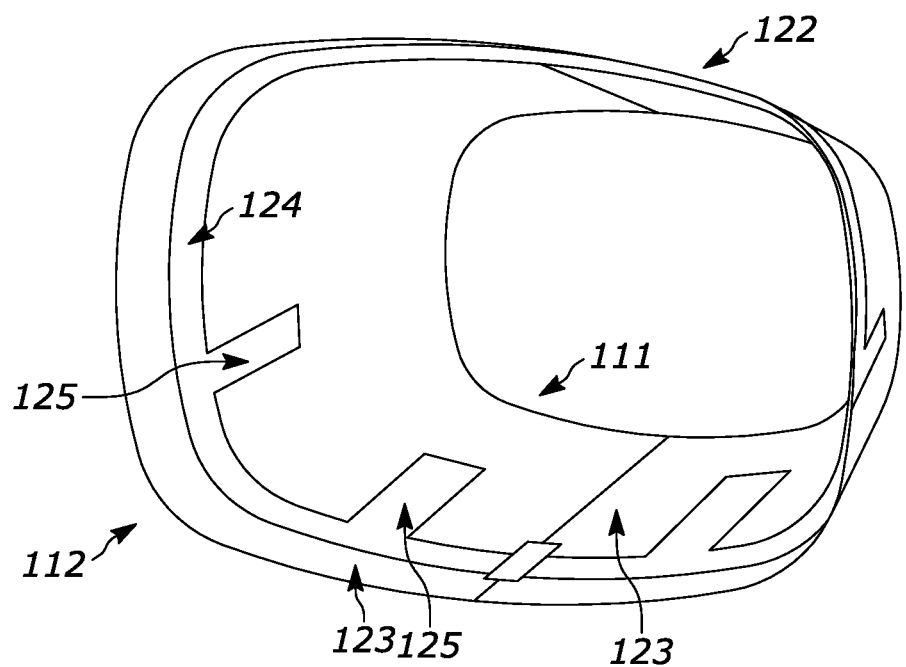

As shown in FIG. 3b, the antenna element 122 may be a slot antenna including cutouts 125 to improve antenna performance at a desired frequency. These cutouts 125 may extend from the slot 124 in any direction that facilitates desired antenna performance at the resonant frequency. For example, the cutouts 125 may be rectangular blocks perpendicular to the radiating slot 124. Additionally, the cutouts 125 may be meandering cutouts to facilitate matching the antenna to its intended resonant frequency.

Figure 3C:
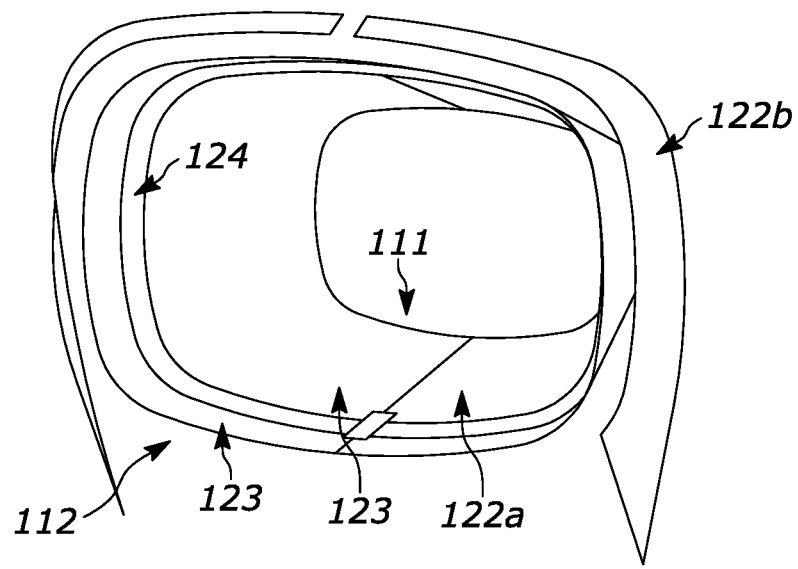

As, shown in FIG. 3c, the antenna assembly 120 may include more than one antenna element (e.g., antenna elements 122a and 122b) to enable RFID performance. For example, the antenna assembly 120 may include two antenna elements 122a, 122b arranged around the inner surface 114 and outer surface 115 of the bezel body 113.

Figure 3D:
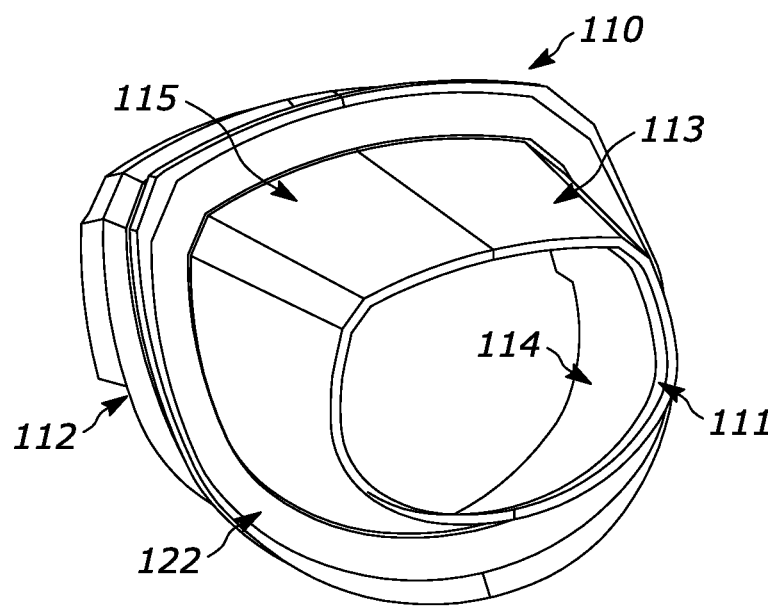

As shown in FIG. 3d, the at least one antenna element 122 may also be arranged on the outer surface 115 of the bezel body 113. For example, the bezel body 113 may include an elevated lip at or near the second opening 112 of the bezel body 113, around which an antenna element 122, such as a dipole antenna, may be arranged such that it is proximate to the scanning engine 107. Additionally, the antenna element 122 may be a monopole antenna, a planar inverted-F antenna, or another type of antenna that is capable of such arrangement and performance.

Generally, positioning an RFID antenna, such as antenna element 122, near the metallic components of the scanning engine 107 would yield interference that would degrade the scanner's performance. However, according to an example embodiment of the present disclosure, positioning a metal antenna element (e.g., a slot antenna) around the inner surface 114 of a bezel body 113 of a handheld scanner 100 allows for RFID functionality without yielding interference that would degrade the scanner's performance. This arrangement allows for a scanning device 100 that is compact while providing RFID and barcode reading capabilities.

Figure 4:
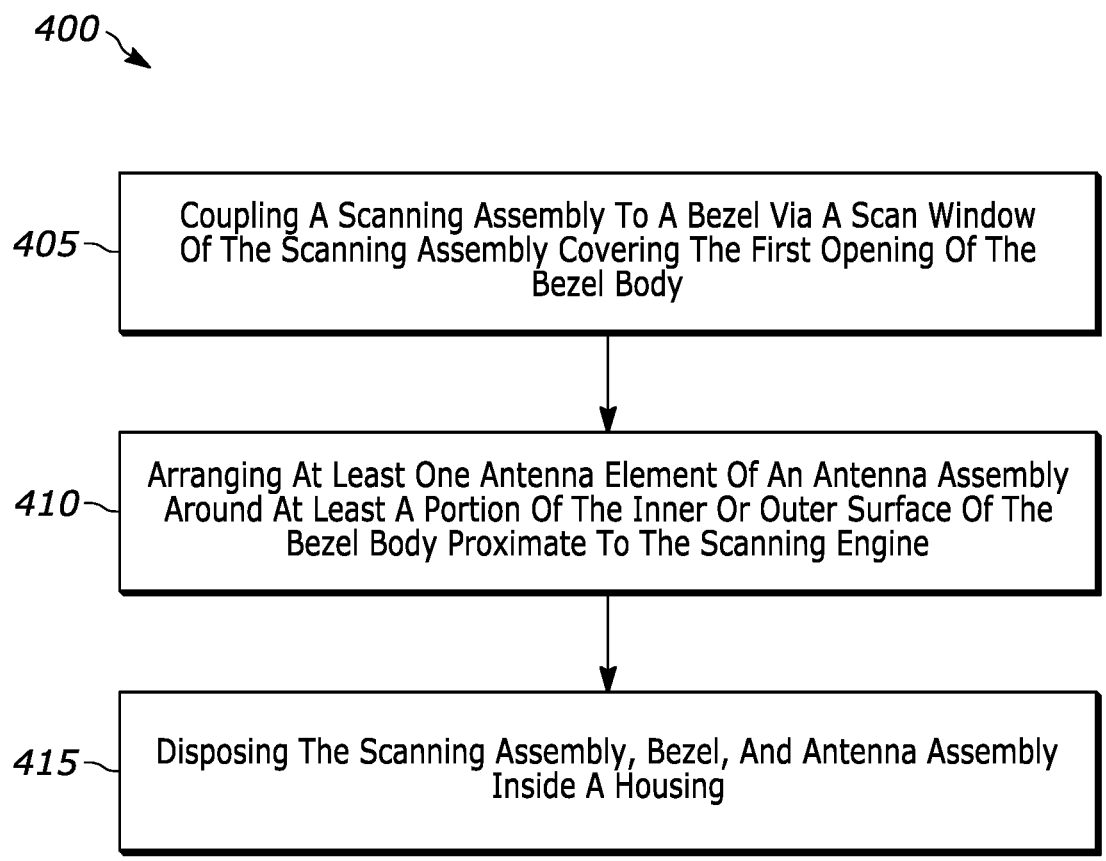
FIG. 4 is a block flowchart of an example embodiment of a method of the present disclosure.

FIG. 4 is a flowchart illustrating a method of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In example method 400, a scanning assembly 105 is coupled to a bezel 110, such that the scan window 106 of the scanning assembly 105 at least partially covers the first opening 111 of the bezel 110 (block 405). For example, a scanning assembly 105 with a glass scan window 106 which is coupled to the scanning engine 107 may entirely cover the first opening 111 of a plastic bezel body 113 so that when the scanning engine 107 is activated, it scans out of the scan window 106 and out from the bezel 110 of the scanning device 100.

Example method 400 also includes arranging at least one antenna element 122 of an antenna assembly 120 around at least a portion of the inner surface 114 or outer surface 115 of the bezel body 113 proximate to the scanning engine 107 (block 410). For example, a slot antenna 122 may be arranged around the inner surface 114 of the bezel body 113 proximate to the scanning engine 107 to enable RFID functionality. Generally, the proximity of an antenna and scanning engine 107 and/or other metallic components of the scanning device 100 yields interference that degrades the performance of the antenna element 122 and the RFID functionality of the scanning device 100. However, by arranging an antenna element 122, for example a slot antenna, in the bezel 110 itself, the antenna element 122 provides for proper RFID functionality.

A slot antenna is formed by cutting a slot or hole into a sheet of metal, which when driven by an applied electric current results in the slot radiating electromagnetic waves as an antenna. The nature of a slot antenna's construction, the radiating element (slot cutout) being surrounded by metallic components (the conductive plane) results in an antenna that is more tolerant of a reflective environment. This tolerance allows for an RFID antenna to be positioned in a shared space with the scanning engine 107, providing a scanner with barcode reading and RFID functionality. Accordingly, a scanning device 100 of the present disclosure achieves RFID and barcode reading functionality, having an RFID antenna in close proximity to the scanning engine 107 while maintaining a compact form.

Additionally, in certain low transmit power applications, a scanning device 107 of the present disclosure may show improved antenna performance over other RFID-integrated handheld scanners which position the RFID antenna away from the scanning engine. This improved performance is a result of the scanning engine 107, configured to enable the reading of barcodes, reflecting a portion of the energy radiated by the RFID antenna 122 toward the RFID tag of interest.

Example method 400 continues to include disposing the scanning assembly 105, bezel 110, and antenna assembly 120 inside a housing 130 (block 415). For example, the housing 130 may include a head portion 131 and a handle portion 136. The head portion 131 may contain the bezel 110, at least a portion of the antenna assembly 120, including the antenna element 122 arranged around the inner surface 114 or outer surface 115 of the bezel body 113, and at least part of the scanning assembly 105. Also, the head portion 131 and handle portion 136 of the housing 130 may be formed as a single-piece molded together.

Figure 5:
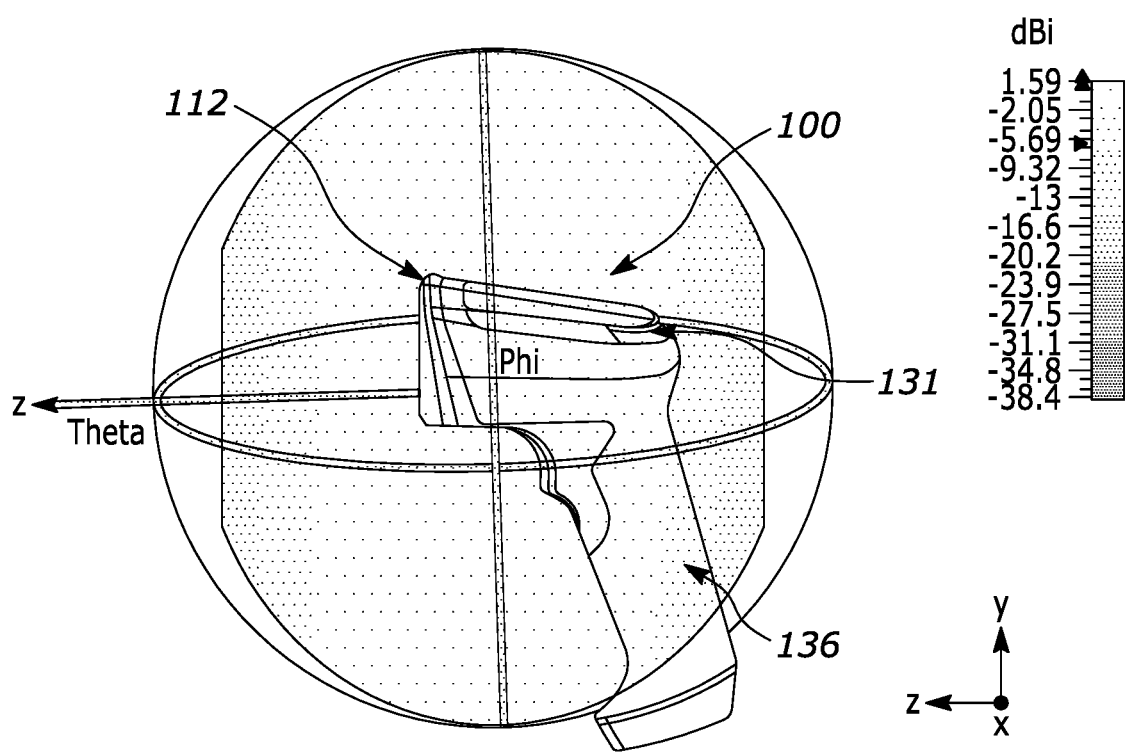
FIG. 5 is a diagram illustrating the radiation pattern of an example embodiment of a scanning device of the present disclosure Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 5 illustrates a radiation pattern of an example embodiment of a scanning device of the present application. The scanning device 100 can read barcodes and RFID tags while maintaining a compact design because an antenna element 122 may be arranged around the inner surface of the bezel 110. For example, a slot antenna may be embedded in the inner surface 114 of the plastic bezel body 113. This arrangement results, for certain low power applications, in improved performance of the antenna element 122 as the scanning engine 107 may reflect a portion of the energy radiated by the antenna element 122 out of the second opening 112 of the bezel 110.

Also, by integrating the RFID antenna, e.g. antenna element 122, into the bezel 110, the scanning device 100 may use considerably less plastic or other materials to form the housing compared to convention devices that requires an outside space or protrusion (e.g., a "chin," "foot," or "crown") to accommodate an RFID antenna. For certain applications, a scanning device 100 of the present disclosure may provide improved RFID functionality through arranging an antenna element 122 around the bezel 110 of the scanning device 100 proximate to the scanning engine 107, while maintaining a compact, user-friendly form that uses less plastic or other materials than conventional devices. For specific applications, a scanning device 100 of the present disclosure may offer improvements over scanning devices that require an outside space, such as a protrusion.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A scanning device comprising:
   a scanning assembly including a scanning engine and a scan window, the scanning engine being coupled to the scan window;
   a bezel including a first opening, a second opening, and a bezel body extending between the first and second opening and having an inner surface and an outer surface, the scan window at least partially covering the first opening of the bezel body;
   an antenna assembly including a transceiver and at least one antenna element, the antenna element being arranged around at least a portion of the inner surface of the bezel body or a portion of a periphery of the outer surface of the bezel body; and
   a housing including a handle portion, a head portion, and a trigger portion, the head portion being configured to include the bezel, at least a portion of the antenna assembly, and at least a portion of the scanning assembly, and the trigger portion extends from the head or handle portion.

2. The device of claim 1, wherein the head portion is configured to have at least a front side, a rear side, a top side, and a bottom side and the handle portion couples to at least one of the bottom side and the rear side of the head portion.

3. The device of claim 1, wherein the second opening is arranged at a front side of the head portion.

4. The device of claim 1, wherein the bezel attaches to the head portion at the second opening.

5. The device of claim 1, wherein at least a portion of the head portion and the handle portion are a single molded piece.

6. The device of claim 1, wherein the scanning engine includes an illumination system, an aiming system, and an optical sensing system.

7. The device of claim 1, wherein the handle portion further comprises ergonomic indentions.

8. The device of claim 1, wherein the antenna assembly is at least partially embedded in the bezel.

9. The device of claim 1, wherein the antenna element is a slot antenna comprising a conductive plane and a slot cutout.

10. The device of claim 9, wherein the slot cutout includes at least one additional cutout.

11. The device of claim 1, wherein the antenna assembly is arranged around the inner surface or outer surface of the bezel body in a location closer to the second opening than the first opening of the bezel.

12. The device of claim 1, wherein the antenna assembly is arranged around the inner surface or outer surface of the bezel body in a location closer to the first opening than the second opening of the bezel.

13. A method comprising:
    coupling a scanning assembly, including a scanning engine and a scan window, the scanning engine being coupled to the scan window, to a bezel, including a first opening, a second opening, and a bezel body extending between the first and second opening and having an inner surface and outer surface, the scan window covering the first opening of the bezel body;
    arranging at least one antenna element of an antenna assembly around at least a portion of the inner surface of the bezel body or a portion of a periphery of the outer surface of the bezel body, the antenna assembly further including a transceiver; and
    disposing the scanning assembly, bezel, and antenna assembly inside a housing, the housing including a head portion, a handle portion, and a trigger portion.

14. The method of claim 13, wherein the head portion is configured to have at least a front side, a rear side, a top side, and a bottom side and the handle portion couples to at least one of the bottom side and the rear side of the head portion.

15. The method of claim 13, wherein the second opening is arranged at a front side of the head portion.

16. The method of claim 13, wherein arranging the at least one antenna element of the antenna assembly further includes arranging the at least one antenna element around at least a portion of the bezel body at a location closer to the second opening than the first opening of the bezel.

17. The method of claim 13, wherein arranging the at least one antenna element of the antenna assembly further includes arranging the at least one antenna element around at least a portion of the bezel body at a location closer to the first opening than the second opening of the bezel.

18. The method of claim 13, further comprising embedding at least a portion of the antenna assembly in the bezel body.

19. The method of claim 13, wherein arranging the at least one antenna element of the antenna assembly further includes arranging a slot antenna around at least a portion of the bezel body.

20. The method of claim 19, wherein arranging the slot antenna further comprises including additional cutouts in the slot of the slot antenna around at least a portion of the bezel body.

* * * * *